United States Patent
Shigeeda

(10) Patent No.: US 10,277,555 B2
(45) Date of Patent: Apr. 30, 2019

(54) IP ADDRESS DISTRIBUTION SYSTEM, SWITCH DEVICE, AND IP ADDRESS DISTRIBUTION METHOD

(71) Applicant: Mitsubishi Electric Corporation, Chiyoda-ku, Tokyo (JP)

(72) Inventor: Tetsuya Shigeeda, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 160 days.

(21) Appl. No.: 15/326,895

(22) PCT Filed: Jul. 18, 2014

(86) PCT No.: PCT/JP2014/069230
§ 371 (c)(1),
(2) Date: Jan. 17, 2017

(87) PCT Pub. No.: WO2016/009562
PCT Pub. Date: Jan. 21, 2016

(65) Prior Publication Data
US 2017/0214653 A1    Jul. 27, 2017

(51) Int. Cl.
*H04L 29/12* (2006.01)
*H04L 12/28* (2006.01)
*H04L 29/08* (2006.01)

(52) U.S. Cl.
CPC ......... *H04L 61/2015* (2013.01); *H04L 12/28* (2013.01); *H04L 61/2046* (2013.01); *H04L 67/12* (2013.01); *H04L 61/6095* (2013.01)

(58) Field of Classification Search
CPC . H04L 61/2015; H04L 61/2046; H04L 67/12; H04L 61/6095
See application file for complete search history.

(56) References Cited

U.S. PATENT DOCUMENTS 7,702,732 B1 *   4/2010   Squire ................ H04L 41/084
                                                           709/206
2001/0005858 A1   6/2001   Ohno et al.
(Continued)

FOREIGN PATENT DOCUMENTS

JP    10-075244 A    3/1998
JP    2001-045033 A    2/2001
(Continued)

OTHER PUBLICATIONS

International Search Report (PCT/ISA/210) dated Sep. 22, 2014, by the Japanese Patent Office as the International Searching Authority for International Application No. PCT/JP2014/069230.
(Continued)

*Primary Examiner* — Kim T Nguyen
(74) *Attorney, Agent, or Firm* — Buchanan Ingersoll & Rooney PC

(57) ABSTRACT

An IP address distribution device sequentially transmits, to a terminal device on receiving an IP address request signal from the terminal device, IP address distribution signals including respective distribution IP addresses that are IP addresses selected one by one from among all unused IP addresses in a network. For the received IP address distribution signals, the switch device is subjected to setting to determine passage or blockage of the IP address distribution signal for each port in accordance with contents of all or a part of the distribution IP address included in the IP address distribution signal.

8 Claims, 8 Drawing Sheets

(56) References Cited

U.S. PATENT DOCUMENTS

| | | | |
|---|---|---|---|
| 2005/0078681 A1 | 4/2005 | Sanuki et al. | |
| 2008/0247399 A1* | 10/2008 | Hazard | H04L 45/02 370/395.31 |
| 2011/0280158 A1 | 11/2011 | Shigeeda | |
| 2012/0023206 A1 | 1/2012 | Kusama et al. | |
| 2012/0263179 A1 | 10/2012 | Shigeeda et al. | |
| 2013/0058253 A1 | 3/2013 | Maruta et al. | |
| 2013/0091255 A1* | 4/2013 | Jai | H04L 61/10 709/220 |
| 2014/0222982 A1 | 8/2014 | Shigeeda | |
| 2014/0344477 A1 | 11/2014 | Shigeeda | |

FOREIGN PATENT DOCUMENTS

| | | |
|---|---|---|
| JP | 2004-104355 A | 4/2004 |
| JP | 2005-072639 A | 3/2005 |
| JP | 2011-205582 A | 10/2011 |
| JP | 4790088 B | 10/2011 |
| JP | 2011-223396 A | 11/2011 |
| JP | 5031125 B | 9/2012 |
| JP | 5106707 B | 12/2012 |
| WO | WO 2011/074123 A1 | 6/2011 |

OTHER PUBLICATIONS

Written Opinion (PCT/ISA/237) dated Sep. 22, 2014, by the Japanese Patent Office as the International Searching Authority for International Application No. PCT/JP2014/069230.

Douglas E. Comer, "Internetworking with TCT/IP", vol. One, 5th Ed. Pearson, Jul. 10, 2005. (9 pages).

* cited by examiner

IP ADDRESS DISTRIBUTION SYSTEM, SWITCH DEVICE, AND IP ADDRESS DISTRIBUTION METHOD

FIELD

The present invention relates to an IP address distribution system, a switch device, and an IP address distribution method.

BACKGROUND

In Ethernet (registered trademark) communication, TCP/IP that is a kind of communication protocol is generally used. In the communication for which TCP/IP is used, a uniquely determined IP address is assigned to each device in a network.

Well-known examples of an IP address distribution method for distributing an IP address to each device in the network include an reverse address resolution protocol (RARP), a bootstrap protocol (BOOTP), and a dynamic host configuration protocol (DHCP) (Non Patent Literature 1).

Generally, in the IP address distribution method, a server that manages IP addresses determines, on receiving a request from a device in the network, an IP address to be distributed to the device. In this case, the server determines the IP address independently of a physical configuration of the network.

CITATION LIST

Non Patent Literature

Non-Patent Literature 1: Douglas E. Comer (Ed.) Internetworking with TCP/IP. Vol. 1. 4th ed. (Kyoritsu Shuppan)

SUMMARY

Technical Problem

However, in a network where a connection between devices constituting the network is designed in advance, an arrangement position of each device in the network is fixed. Therefore, it is desirable that an IP address that depends on the arrangement position should be given to each device, and in a case where replacement of the device is required due to a breakdown of the device, an IP address of a post-replacement device is desirably the same as the IP address given to the broken device. This is because, when the device breaks down causing abnormality of communication, such a broken device can be easily specified using the IP address given to the device that causes the abnormality of communication, whereby the convenience of management of the device is enhanced.

Although an operator's manual setting of the IP address makes it possible to give the post-replacement device the same IP address as that given to the pre-replacement device, provision of a mechanism to automatically give the IP address can improve ease of operation and thus prevent an error in setting.

The present invention has been made in view of the foregoing, and an object of the present invention is to obtain an IP address distribution system, a switch device and an IP address distribution method that are capable of, when the device replacement occurs, automatically distributing to the post-replacement device the same fixed IP address as that of the pre-replacement device.

Solution to Problem

In order to solve the above-mentioned problem and achieve the object, an IP address distribution system according to the present invention includes a terminal device to serve as a request source of an IP address and an IP address distribution device to serve as a distribution source of the IP address, the terminal device and the IP address distribution device are connected to a network including a switch device having a plurality of ports, the IP address distribution device sequentially transmits, to the terminal device in response to receiving an IP address request signal from the terminal device, IP address distribution signals including respective distribution IP addresses that are IP addresses selected one by one from among all unused IP addresses in the network, and for the IP address distribution signals received at the switch device, setting is performed in the switch device such that passing or blockage of the IP address distribution signal is determined for each of the ports of the switch device in accordance with contents of all or a part of the distribution IP address included in the IP address distribution signal.

Advantageous Effects of Invention

According to the present invention, the effect that when the device replacement occurs, the same fixed IP address as that of the pre-replacement device can be automatically distributed to the post-replacement device.

DESCRIPTION OF EMBODIMENTS

Hereinafter, embodiments of an IP address distribution system, a switch device, and an IP address distribution method according to the present invention will be described in detail based on the drawings. The present invention is not limited to the embodiments.

First Embodiment

Figure 1:
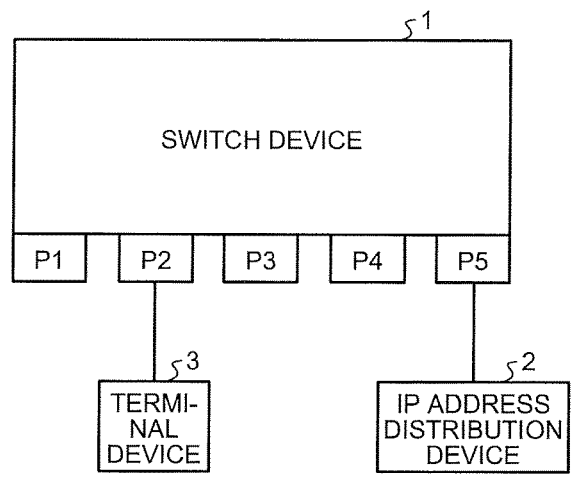
FIG. 1 is a diagram illustrating an exemplary configuration of an IP address distribution system according to a first embodiment.

FIG. 1 is a diagram illustrating an exemplary configuration of an IP address distribution system according to the present embodiment. The IP address distribution system according to the present embodiment includes a switch device 1 constituting a network, an IP address distribution device 2 connected to the switch device 1, and a terminal device 3 connected to the switch device 1.

The switch device 1 is a switch device constituting the network. The network as used herein is a network with the use of Ethernet (registered trademark), in which TCP/IP is used as a communication protocol. The switch device 1 and the terminal device 3 are connected by a network cable. In a similar manner, the switch device 1 and the IP address distribution device 2 are connected by a network cable.

The switch device 1 includes five ports P1 to P5. The ports P1 to P5 are physical ports. The IP address distribution device 2 is connected to the port P5 of the switch device 1, and the terminal device 3 is connected to the port P2 of the switch device 1. Hereinafter, a "port P" is a general term for the ports P1 to P5.

The IP address distribution device 2 manages IP addresses, and can distribute an IP address to the terminal device 3 in response to a request from the terminal device 3. The terminal device 3, which is a request, source of the IP address, is a device connected to the network.

In the present embodiment, a physical configuration of the network is fixed as illustrated in FIG. 1. Specifically, a switch device constituting the network is the switch device 1 alone, the terminal device 3 is always connected to the port P2 of the switch device 1, and the IP address distribution device 2 is always connected to the port P5 of the switch device 1. Therefore, in a case where the terminal device 3 breaks down, a post-replacement terminal device 3 is connected to the port P2 of the switch device 1. A communication path extending from the terminal device 3 to the IP address distribution device 2 is also fixed.

Figure 2:
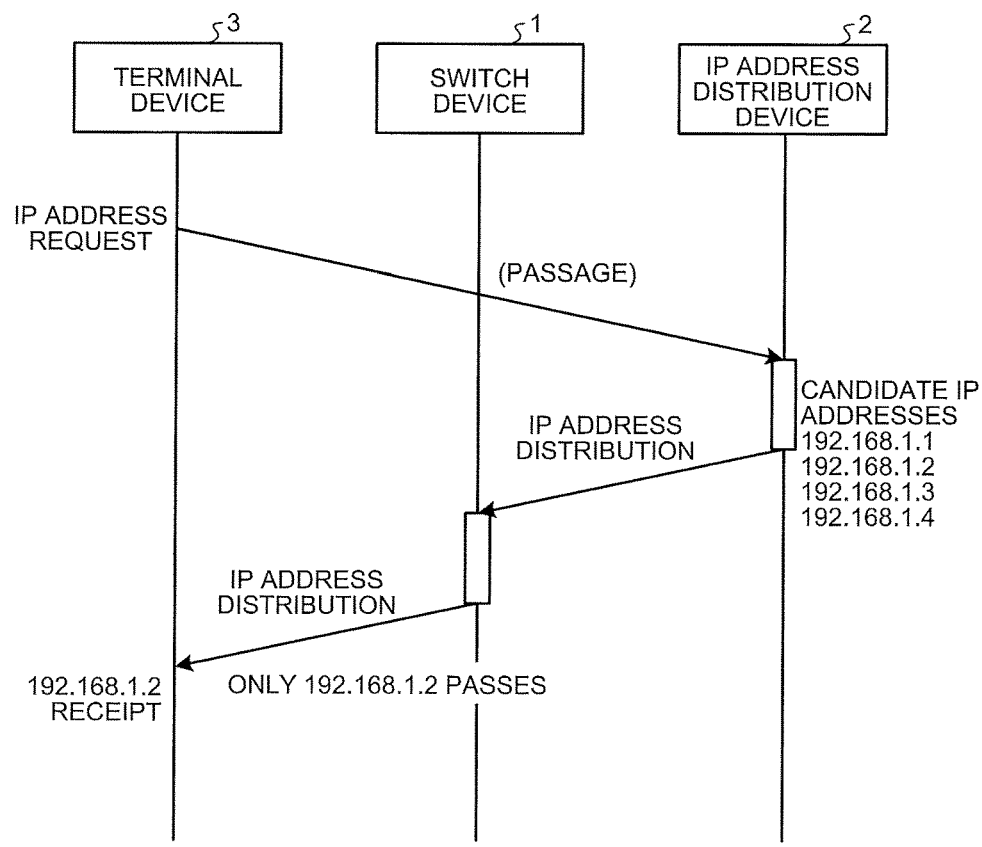
FIG. 2 is a sequence diagram illustrating exemplary IP address distribution operation.

FIG. 2 is a sequence diagram illustrating exemplary IP address distribution operation in the present embodiment. First, as illustrated in FIG. 2, the terminal device 3 sends an IP address request signal to the network by means of broadcasting. A transmission destination address of the IP address request signal is a broadcast address, and a transmission source address is a MAC address of the terminal device 3. The IP address request signal passes through the switch device 1 and reaches the IP address distribution device 2 by means of broadcasting.

On receiving the IP address request signal, the IP address distribution device 2 selects, from among the IP addresses managed by the IP address distribution device 2, candidate IP addresses that are candidates for an IP address to be given to the request source that is the terminal device 3. The candidate IP addresses as used herein are all unused IP addresses in the network. In the illustrated example, the candidate IP addresses are "192.168.1.1", "192.168.1.2", "192.168.1.3", and "192.168.1.4". Generally, a 32-bit IP address provided by first to fourth octets is used in IPv4.

Next, the IP address distribution device 2 selects the IP addresses one by one from among the candidate IP addresses, and sequentially transmits, to the request source that is the terminal device 3, IP address distribution signals corresponding in number to the candidate IP addresses and including the selected respective IP addresses as distribution IP addresses. In this case, a transmission destination address is the MAC address of the terminal device 3, and a transmission source address is a MAC address of the IP address distribution device 2. The IP address distribution signals sequentially reach the switch device 1 through the port P5 of the switch device 1.

Hereinafter, a function that is given to the switch device 1 in advance will be described. Whether the IP address distribution signal received at the switch device 1 passes through the port P and is output from the switch device 1 is set in advance for each port P in accordance with the distribution IP address included in the IP address distribution signal. That is, the switch device 1 is set in advance so that each port P allows only the IP address distribution signal including a specific distribution IP address to pass therethrough.

For example, the port P1 allows only the IP address distribution signal including the distribution IP address having "1" in the fourth octet to pass therethrough, the port P2 allows only the IP address distribution signal including the distribution IP address having "2" in the fourth octet to pass therethrough, the port P3 allows only the IP address distribution signal including the distribution IP address having "3" in the fourth octet to pass therethrough, the port P4 allows only the IP address distribution signal including the distribution IP address having "4" in the fourth octet to pass therethrough, and the port P5 allows only the IP address distribution signal including the distribution IP address having "5" in the fourth octet to pass therethrough.

Therefore, when the IP address distribution signal reaches the switch device 1, the switch device 1 refers to the fourth octet of the distribution IP address included in the IP address distribution signal, and causes each port P to allow the IP address distribution signal to pass therethrough or block the IP address distribution signal in accordance with the contents of the fourth octet.

The pore P2 to which the terminal device 3 is connected, allows the passage of only the IP address distribution signal including the distribution IP address having "2" in the fourth octet. Therefore, only the IP address distribution signal including the distribution IP address "192.168.1.2" is transmitted to the terminal device 3 through the port P2. The IP address distribution signals including the other IP addresses serving as the distribution IP addresses, more specifically, "192.168.1.1", "192.168.1.3", and "192.168.1.4", are blocked by the port P2. In other words, although the IP address distribution device 2 sequentially transmits all the candidate IP addresses to the terminal device 3, only the IP address "192.168.1.2" is distributed to the terminal device 3 since the port P2 of the switch device 1 allows only the IP address distribution signal including the distribution IP address "192.168.1.2" to pass therethrough.

The terminal device 3 that has received the IP address distribution signal sets the distribution IP address included in the IP address distribution signal, as its own IP address. In this case, the terminal device 3 sets the IP address "192.168.1.2" as its own IP address.

The IP address distribution device 2 manages used IP addresses and unused IP addresses separately in an IP address management table. The IP address distribution device 2 can use an address resolution protocol (ARP) to update the IP address management table.

Figure 3:
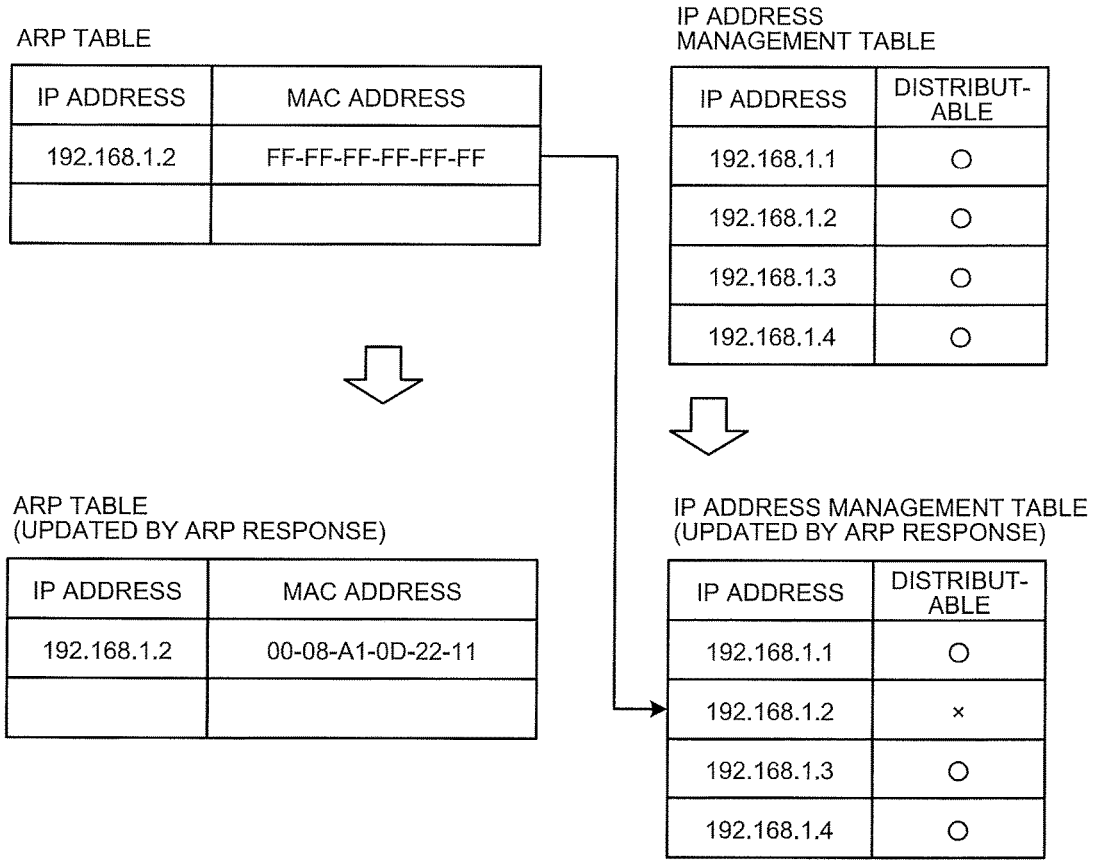
FIG. 3 is a diagram illustrating an exemplary method for managing IP addresses.
Figure 4:
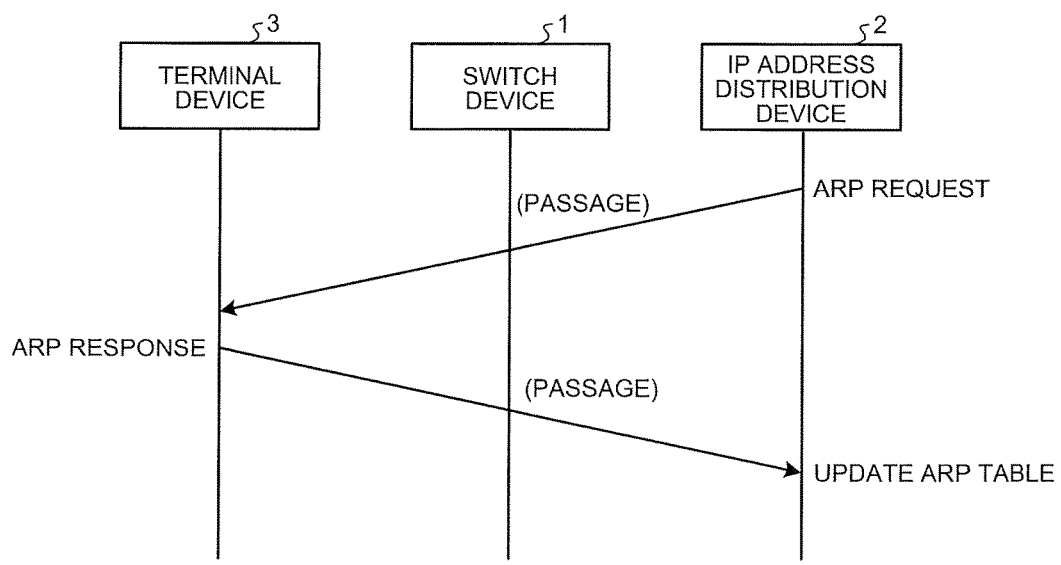
FIG. 4 is a sequence diagram illustrating an exemplary ARP process.

FIG. 3 is a diagram illustrating an exemplary method for managing the IP addresses, and FIG. 4 is a sequence diagram illustrating an exemplary ARP processing. The IP address distribution device 2 includes an ARP table in which an IP address corresponds to a MAC address. The IP address distribution device 2 can broadcast an ARP request when there is an IP address corresponding to an unknown MAC address, and can inquire the MAC address of the terminal device 3 that uses the IP address corresponding to the unknown MAC address. The terminal device 3 performs an ARP response to notify the IP address distribution device 2 of its own MAC address. The IP address distribution device 2 can update the ARP table on the basis of the ARP response.

More specifically, since a MAC address for the IP address "192.168.1.2" is unknown in the ARP table, the IP address distribution device 2 performs the ARP request that inquires the MAC address of the terminal device 3 that uses the IP address "192.163.1.2". Since the ARP request is broadcast, the ARP request passes through the switch device 1 and reaches the terminal device 3. Since the terminal device 3 uses the IP address "192.168.1.2", the terminal device 3 performs the ARP response that notifies the IP address distribution device 2 of its own MAC address "00-08-A1-0D-22-11". After reaching the switch device 1, the ARP response passes through the port P1, and reaches the IP address distribution device 2. The IP address distribution device 2 updates the ARP table on the basis of the ARP response.

The IP address distribution device 2 updates the IP address management table in response to the update of the ARP table. More specifically, before the IP address is distributed to the terminal device 3, all of "192.168.1.1" to "192.168.1.4" are managed in the IP address management table as distributable IP addresses. However, after the IP address is distributed to the terminal device 3, "192.168.1.2" is managed as being not distributable, due to the update of the ARP table based on the ARP response.

On receiving the IP address request signal, the IP address distribution device 2 can select the candidate IP addresses by referring to the IP address management table. The candidate IP addresses are all the IP addresses managed, as being distributable in the IP address management table.

Next, a case where the terminal device 3 breaks down will be considered. In this case, in the IP address management table, the IP address "192.168.1.2" distributed to the broken terminal device 3 is changed to be distributable, and in the ARP table, the MAC address corresponding to the IP address "192.168.1.2" is changed to the "unknown" MC address. This processing may be performed by rewriting the IP address management table and the ARP table by external inputs. Alternatively, this processing may be performed by the IP address distribution device 2 on its own when the IP address distribution device 2 detects a communication failure between the IP address distribution device 2 and the terminal device 3. After the terminal device 3 is replaced, the post-replacement terminal device 3 sends the IP address request signal to the network. Operation subsequent to the creation and output of the IP address request signal from the post-replacement terminal device 3 is the same as that already described. In other words, the IP address "192.168.1.2" distributed to the pre-replacement terminal device 3 is fixedly distributed to the post-replacement terminal device 3.

According to the present embodiment, the IP address distribution device 2 sequentially transmits, to the terminal device 3 on receiving the IP address request signal from the terminal device 3, the IP address distribution signals including the respective distribution IP addresses that are the IP addresses selected one by one from among all the unused IP addresses in the network. In the switch device 1, for the IP address distribution signals received at the switch device 1, the passage or blockage of the IP address distribution signal is set in advance for each port P of the switch device 1 in accordance with the contents of the distribution IP address included in the IP address distribution signal. Therefore, the predetermined IP address can be fixedly given to the terminal device 3. Thus, in a case where the replacement of the device occurs, the same IP address as that of the pre-replacement terminal device 3 can be automatically distributed to the post-replacement terminal device 3.

In the present embodiment, the passage or blockage of the distribution IP address is determined for each port P in accordance with the contents of the fourth octet of the distribution IP address. However, the determination is not limited to this example. Generally, the passage or blockage of the distribution IP address can be determined for each port P in accordance with the contents of all or a part of the distribution IP address. In this case as well, in the same manner as that in the present embodiment, the fixed IP address can be distributed to the terminal device 3. For example, the ports P1 to P5 can also be set so as to allow only the distribution IP addresses respectively having "1" to "5" in the third octets to pass therethrough. In this case, when the candidate IP addresses are, for example, "192.168.1.1" to "192.168.4.1", the IP address "192.168.2.1" is fixedly given to the terminal device 3.

In the present embodiment, the number of ports of the switch device 1 is five. However, a different number of ports may be provided, and the port P to which each of the terminal device 3 and the IP address distribution device 2 is connected is also not limited to the illustrated example. This applies to the following embodiments.

Second Embodiment

Figure 5:
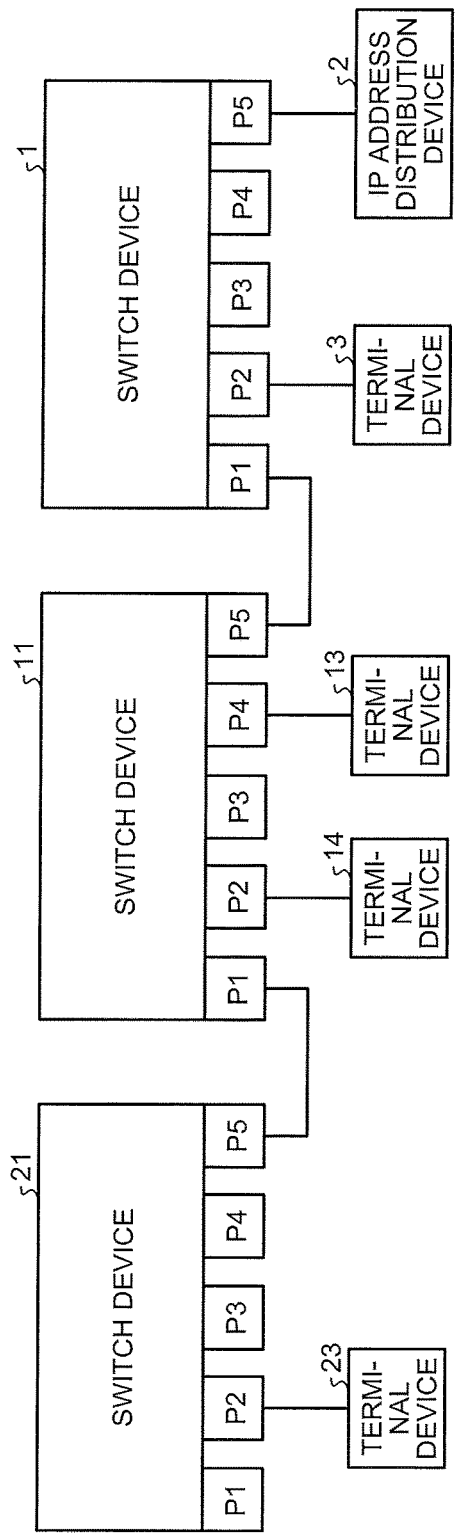
FIG. 5 is a diagram illustrating an exemplary configuration of an IP address distribution system according to a second embodiment.

FIG. 5 is a diagram illustrating an exemplary configuration of an IP address distribution system according to the present embodiment. In FIG. 5, components that are the same as those in FIG. 1 are denoted by the same reference signs.

As illustrated in FIG. 5, the IP address distribution system according to the present embodiment includes switch devices 1, 11, and 21 constituting the network, the IP address distribution device 2 connected to the switch device 1, the terminal device 3 connected to the switch device 1, terminal devices 13 and 14 connected to the switch device 11, and a terminal device 23 connected to the switch device 21. In other words, in the present embodiment, the network includes the three switch devices 1, 11, and 21.

The switch devices 1, 11, and 21 are switch devices for Ethernet (registered trademark) as in the first embodiment. Each of the switch devices 1, 11, and 21 includes the five ports P1 to P5. The ports P1 to P5 are physical ports.

The port P1 of the switch device 1 is connected to the port P5 of the switch device 11, and the port P1 of the switch device 11 is connected to the port P5 of the switch device 21. The IP address distribution device 2 is connected to the port P5 of the switch device 1, and the terminal device 3 is connected to the port P2 of the switch device 1. The terminal device 13 is connected to the port P4 of the switch device 11, and the terminal device 14 is connected to the port P2 of the switch device 11. The terminal device 23 is connected to the port P2 of the switch device 21. The switch devices 1 and 11 are connected by a network cable, and the switch devices 11 and 21 are connected by a network cable. Similarly, the IP address distribution device 2 and the switch device 1 are connected by a network cable, the terminal device 3 and the switch device 1 are connected by a network cable, the terminal device 13 and the switch device 11 are connected by a network cable, the terminal device 14 and the switch device 11 are connected by a network cable, and the terminal device 23 and the switch device 21 are connected by a network cable.

The IP address distribution device 2 manages the IP addresses, and can distribute the IP addresses to the terminal devices 3, 13, 14, and 23 in response to the requests from the terminal device 3, 13, 14, and 23. The IP address distribution device 2 is the same as that described in the first embodiment.

In the same manner as that in the first embodiment, a physical configuration of the network is fixed as illustrated in FIG. 5.

Functions that are given to the switch devices 1, 11, and 21 in advance will be described. Whether the IP address distribution signal received at each of the switch devices 1, 11, and 21 passes through the port P of the switch devices 1, 11, and 21 is set for each port P of the switch devices 1, 11, and 21 in advance in accordance with the distribution IP address included in the IP address distribution signal. That is, each of the switch devices 1, 11, 21 is set so that each port P allows only the IP address distribution signal including a specific distribution IP address to pass therethrough.

For example, the functions of the switch devices 1, 11, and 21 are set as follows. First, in the switch device 1, the port P1 connected to the switch device 11 unconditionally allows the IP address distribution signal to pass therethrough, the port P2 allows only the IP address distribution signal including the distribution IP address having "2" in the fourth octet to pass therethrough, the port P3 allows only the IP address distribution signal including the distribution IP address having "3" in the fourth octet to pass therethrough, the port P4 allows only the IP address distribution signal including the distribution IP address having "4" in the fourth octet to pass therethrough, and the port P5 allows only the IP address distribution signal including the distribution IP address having "5" in the fourth octet to pass therethrough.

Furthermore, in the switch device 11, the ports P1 and P5 respectively connected to the switch devices 1 and 21 unconditionally allow the IP address distribution signals to pass therethrough, the port P2 allows only the IP address distribution signal including the distribution IP address having "7" in the fourth octet to pass therethrough, the port P3 allows only the IP address distribution signal including the distribution IP address having "8" in the fourth octet to pass therethrough, and the port P4 allows only the IP address distribution signal including the distribution IP address having "9" in the fourth octet to pass therethrough.

Furthermore, in the switch device 21, the port, P1 allows only the IP address distribution signal including the distribution IP address having "11" in the fourth octet to pass therethrough, the port P2 allows only the IP address distribution signal including the distribution IP address having "12" in the fourth octet to pass therethrough, the port P3 allows only the IP address distribution signal including the distribution IP address having "13" in the fourth octet to pass therethrough, the port P4 allows only the IP address distribution signal including the distribution IP address having "14" in the fourth octet to pass therethrough, and the port P5 connected to the switch device 11 unconditionally allows the IP address distribution signal to pass therethrough.

Under the above-mentioned setting for the switch devices 1, 11, and 21, in a case where, for example, the terminal device 3 sends the IP address request signal and the IP address distribution device 2 generates, for example, "192.168.1.1" to "192.168.1.15" as the candidate IP addresses, only the IP address distribution, signal including the distribution IP address "192.168.1.2" among the fifteen IP address distribution signals transmitted from the IP address distribution device 2 toward the terminal device 3 reaches the terminal device 3. Therefore, the IP address "192.168.1.2" is fixedly given to the terminal device 3.

In addition, in a case where, for example, the terminal device 13 sends the IP address request signal and the IP address distribution device 2 generates the same candidate IP addresses as described above, only the IP address distribution signal including the distribution IP address "192.168.1.9" among the fifteen IP address distribution signals transmitted from the IP address distribution device 2 toward the terminal device 13 reaches the terminal device 13. More specifically, the IP address distribution signals transmitted from the IP address distribution device 2 reach the switch device 1 through the port P5 of the switch device 1, and thereafter reach the switch device 11 through the port P1 of the switch device 1 and the port P5 of the switch device 11. Then, only the IP address distribution signal including the distribution IP address "192.168.1.9" that is capable of passing through the port P4 of the switch device 11 reaches the terminal device 13. Therefore, only the IP address "192.168.1.9" is distributed to the terminal device 13. A case where the terminal device 14 sends the IP address request signal can also be described in the same manner.

In addition, in a case where, for example, the terminal device 23 sends the IP address request signal, and the IP address distribution device 2 generates the same candidate IP addresses as described above, only the IP address distribution signal, including the distribution IP address "192.168.1.12" among the fifteen IP address distribution signals transmitted from the IP address distribution device 2 toward the terminal device 3 reaches the terminal device 23. Since the IP address distribution signals are not blocked between the switch devices 1 and 11 and between the switch devices 11 and 21, all the fifteen IP address distribution signals reach the switch device 21, and the IP address distribution signal that eventually reaches the terminal device 23 is only the IP address distribution signal that passes through the port P2 of the switch device 21.

In the present embodiment, the passage or blockage of the distribution IP address is determined for each port P in the switch devices 1, 11, and 21 in accordance with the contents of the fourth octet of the distribution IP address. However, the determination is not limited to this example. Generally, the passage or blockage of the distribution IP address may be determined for each port P in accordance with the contents of all or a part of the distribution IP address.

For example, in the switch devices 1, 11, and 21, the passage or blockage of the distribution IP address can be determined for each port P in accordance with the contents of the third and fourth octets of the distribution IP address. More specifically, for example, the ports P2 to P5 of the switch device 1 allow only the distribution IP addresses having "1" in the third octets and respectively having "2" to "5" in the fourth octets to pass therethrough, the ports P2 to P4 of the switch device 11 allow only the distribution IP addresses having "2" in the third octets and respectively having "2" to "4" in the fourth octets to pass therethrough, and the ports P1 to P4 of the switch device 21 allow only the distribution IP addresses having "3" in the third octets and respectively having "1" to "4" in the fourth octets to pass therethrough. In addition, the candidate IP addresses are, for example, "192.168.1.2", "192.168.2.2", "192.168.2.4", and "192.168.3.2". In this case, the IP address "192.168.1.2", the IP address "192.168.2.2", the IP address "192.168.2.4", and the IP address "192.168.3.2" are fixedly given to the terminal device 3, the terminal device 14, the terminal device 13, and the terminal device 23, respectively.

According to the present embodiment, in the same manner as that in the first embodiment, the predetermined IP addresses can be fixedly given to the terminal devices 3, 13, 14, and 23, and when the device replacement occurs, the same IP addresses as those of pre-replacement terminal devices 3, 13, 14, 23 can be automatically distributed to the post-replacement terminal devices 3, 13, 14, and 23. The other configuration, operation and effect of the present embodiment is the same as that in the first embodiment.

The first and second embodiments can be easily generalized. That is, in the IP address distribution system including the network constituted by any number of switch devices and any number of terminal devices and the IP address distribution devices 2 are connected to the network, in response to the request for the IP address from any one of the terminal devices, the IP address distribution signals are sequentially transmitted from the IP address distribution device 2 to the request source that is the terminal device, the IP address distribution signal is unconditionally allowed to pass between the switch devices, and each switch device is set so that the passage or blockage of the IP address distribution signal is determined for each port P in accordance with the contents of all or a part of the distribution IP address included in the IP address distribution signal.

In this case, in order that the different distribution IP addresses reach the different terminal devices, each switch device is set so that the passage or blockage of the IP address distribution signal is determined for each port P in accordance with the contents of all or a part of the distribution IP address included in the IP address distribution signal. This makes it possible to uniquely and fixedly distribute the IP address to any terminal device connected to the network.

In the configuration that unconditionally allows the IP address distribution signal to pass between the switch devices, the IP address distribution signal that reaches the terminal device is determined only by the above-mentioned setting in the switch device to which the terminal device is directly connected. Therefore, the above-mentioned setting in the switch device can be unique to the switch device, except where the setting is applied to the port to which another switch device is connected. In other words, the above-mentioned setting in the switch device can be different from that in another switch device.

Third Embodiment

Figure 6:
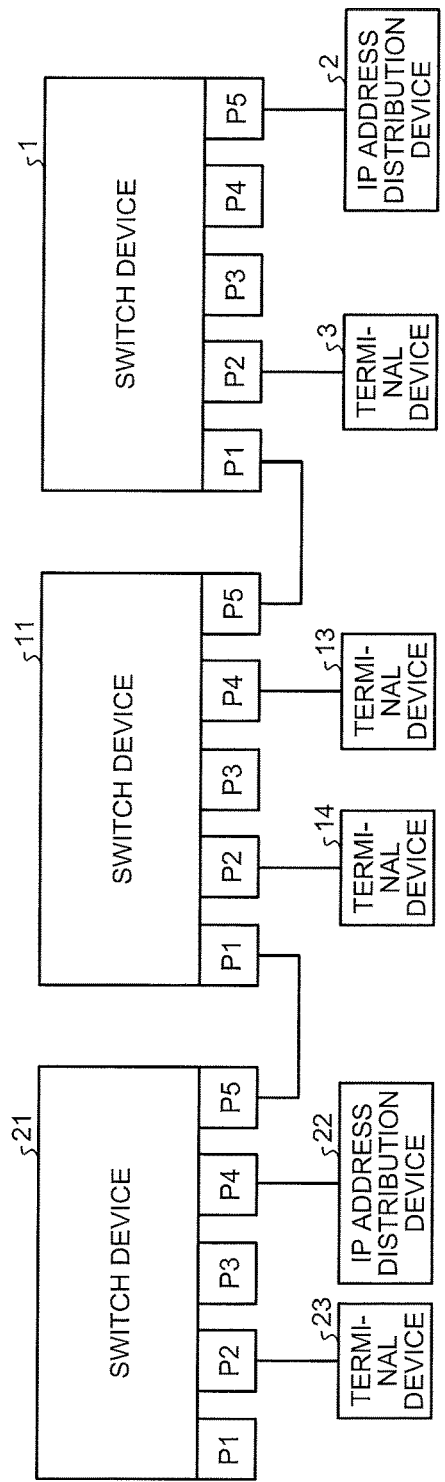
FIG. 6 is a diagram illustrating an exemplary configuration of an IP address distribution system according to a third embodiment.

FIG. 6 is a diagram illustrating an exemplary configuration of an IP address distribution system according to the present embodiment. As illustrated in FIG. 6, the IP address distribution system according to the present embodiment includes, in addition to the configuration illustrated in FIG. 5, an IP address distribution device 22 connected to the port P4 of the switch device 21. That is, the IP address distribution system according to the present embodiment includes the IP address distribution, device 2 that is a first IP address distribution device and the IP address distribution device 22 that is a second IP address distribution device. Each of the IP address distribution devices 2 and 22 includes the same function as that of the IP address distribution device 2 described in the first and second embodiments. The other configuration, operation and effect of the present, embodiment is the same as those in the first and second embodiments.

It is assumed that, the same functions as those in the second embodiment are given to the switch devices 1, 11, and 21. More specifically, in the switch device 1, the port P1 unconditionally allows the IP address distribution signal to pass therethrough, and the ports P2 to P5 allow only the IP address distribution signals including the distribution IP addresses respectively having "2" to "5" in the fourth octets to pass therethrough. In the switch device 11, the ports P1 and P5 unconditionally allow the IP address distribution signals to pass therethrough, and the ports P2 to P4 allow only the IP address distribution signals including the distribution IP addresses respectively having "7" to "9" in the fourth octets to pass therethrough. In the switch device 21, the port P5 unconditionally allows the IP address distribution signal to pass therethrough, and the ports P1 to P4 allow only the IP address distribution signals including the distribution IP addresses respectively having "11" to "14" in the fourth octets to pass therethrough.

Figure 7:
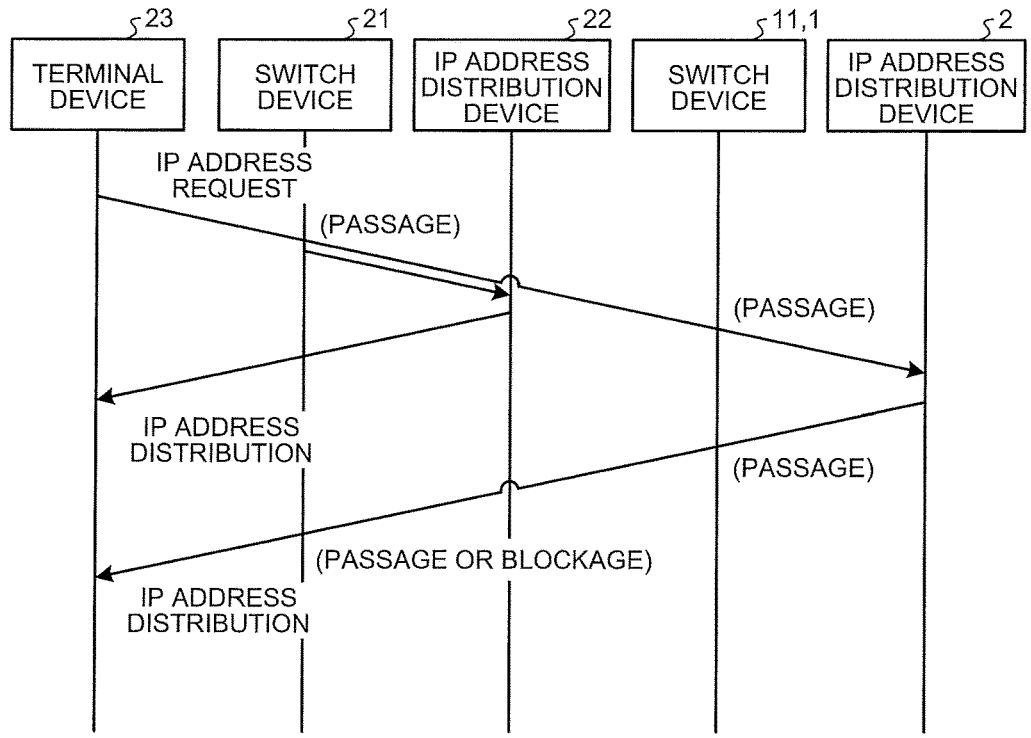
FIG. 7 is a sequence diagram illustrating exemplary IP address distribution operation according to the third embodiment.

FIG. 7 is a sequence diagram illustrating exemplary IP address distribution operation in the present embodiment. First, as illustrated in FIG. 7, the terminal device 23 sends the IP address request signal to the network by means of broadcasting. By means of broadcasting, the IP address request signal passes through the switch device 21 and reaches the IP address distribution device 22 while passing through the switch devices 21, 11, and 1 in order and reaching the IP address distribution device 2.

On receiving the IP address request signal, the IP address distribution device 22 selects the candidate IP addresses, and selects the IP addresses one by one from among the candidate IP addresses. The IP address distribution device 22 then sequentially transmits the IP address distribution signals including the selected IP addresses as the distribution IP addresses, in correspondence to the number of the candidate IP addresses. The candidate IP addresses are, for example, "192.168.1.1" to "192.168.1.15".

The IP address distribution signals transmitted from the IP address distribution device 22 reach the switch device 21 through the port P4 of the switch device 21. Then, only the IP address distribution signal including the distribution IP address "192.168.1.12" that is capable of passing through the port P2 of the switch device 21 is distributed to the terminal device 23.

Meanwhile, on receiving the IP address request signal, the IP address distribution device 2 generates the candidate IP addresses, and selects the IP addresses one by one from among the candidate IP addresses. The IP address distribution device 2 then sequentially transmits the IP address distribution signals including the selected IP addresses as the distribution IP addresses, in correspondence to the number of the candidate IP addresses. The IP address distribution device 3 selects the same candidate IP addresses as the IP address distribution device 22 selects.

The IP address distribution signals transmitted from the IP address distribution device 2 reach the switch device 1 through the port P5 of the switch device 1, reach the switch device 11 through the port P1 of the switch device 1 and the port P5 of the switch device 11, and further reach the switch device 21 through the port P1 of the switch device 11 and the port P5 of the switch device 21. Then, only the IP address distribution signal including the distribution IP address "192.168.1.12" that is capable of passing through the port P2 of the switch device 21 is distributed to the terminal device 23.

In other words, even in a case where the two IP address distribution devices 2 and 22 including the same function exist in the network, the IP addresses distributed from the respective IP address distribution devices 2 and 22 to the terminal device 23 are the same. Therefore, the terminal device 23 may use the IP address distributed from either of the IP address distribution devices 2 and 22.

Although, in FIG. 7, the case where the IP address request is made by the terminal device 23 is described, the same applies to cases where the IP address requests are made by the respective terminal devices 3, 13, and 14, and the same fixed IP address is given from each of the IP address distribution devices 2 and 22 to the request source in any of these cases.

Although, in the present embodiment, the description is made as to the configuration that provides the two IP address distribution devices, the same applies to a case where three or more IP address distribution devices are provided.

Generally, in a case where a plurality of IP address distribution devices exists in the network, IP addresses distributed from the plurality of respective IP address distribution devices to the request source are not necessarily the same. According to the present embodiment, however, even in a case where the plurality of IP address distribution devices is provided, the same fixed IP address is distributed to the request source. Therefore, even in a case where one of the IP address distribution devices breaks down, another IP address distribution device functions, whereby redundancy of the IP address distribution processing is ensured. The other configuration, operation and effect of the present embodiment is the same as those in the first and second embodiments.

Fourth Embodiment

Figure 8:
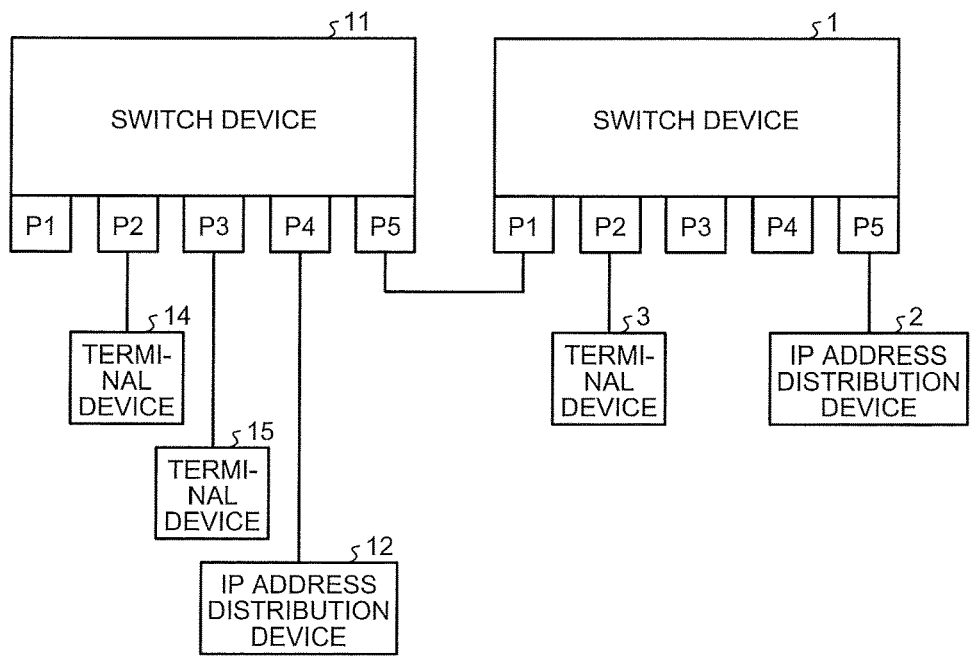
FIG. 8 is a diagram illustrating an exemplary configuration of an IP address distribution system according to a fourth embodiment.

FIG. 8 is a diagram illustrating an exemplary configuration of an IP address distribution system according to the present embodiment. As illustrated in FIG. 8, the IP address distribution system according to the present embodiment includes the switch devices 1 and 11 that constitute the network, the IP address distribution device 2 connected to the switch device 1, the terminal device 3 connected to the switch device 1, terminal devices 14 and 15 connected to the switch device 11, and an IP address distribution device 12 connected to the switch device 11.

More specifically, the port P1 of the switch device 1 is connected to the port P5 of the switch device 11, the IP address distribution device 2 is connected to the port P5 of the switch device 1, and the terminal device 3 is connected to the port P2 of the switch device 1. The IP address distribution device 12 is connected to the port P4 of the switch device 11, the terminal device 14 is connected to the port P2 of the switch device 11, and the terminal device 15 is connected to the port P3 of the switch device 11. A physical configuration of the network of the present embodiment is fixed as illustrated in FIG. 8.

The IP address distribution devices 2 and 12 include the same functions as those of the IP address distribution devices 2 and 22 described in the third embodiment.

Each of the terminal devices 3, 14, and 15 can send the IP address request signal to the network.

However, in the present embodiment, the IP address request signal sent from the terminal device 3 is blocked by the port P1 of the switch device 1 and never reaches the switch device 11, and the IP address request signal sent from the terminal device 14 or the terminal device 15 is likewise blocked by the port P1 of the switch device 1 and not relayed by the switch device 1.

In other words, the IP address request signal sent from the terminal device 3 never reaches the IP address distribution device 12, and the terminal device 3 receives the distribution of the IP address from, the IP address distribution device 2. Similarly, the IP address request signal sent from the terminal device 14 or the terminal device 15 never reaches the IP address distribution device 2, and the terminal device 14 or the terminal device 15 receives the distribution of the IP address form the IP address distribution device 12.

In this manner, the network in the present embodiment is configured such that an arrival range of the IP address request signal sent, from the terminal device 3 and an arrival range of the IP address request signal sent from the terminal device 14 or the terminal device 15 do not overlap each other, and the IP address distribution device 2 is included in one of the arrival ranges and the IP address distribution device 12 is included in the other arrival range.

In order to segment the arrival range of the IP address request signal in this manner, for example, a predetermined specific logic port number is included in the IP address request signal, and the switch device 1 is set so that the IP address request signal including the logic port number is blocked by the port P1.

Figure 9:
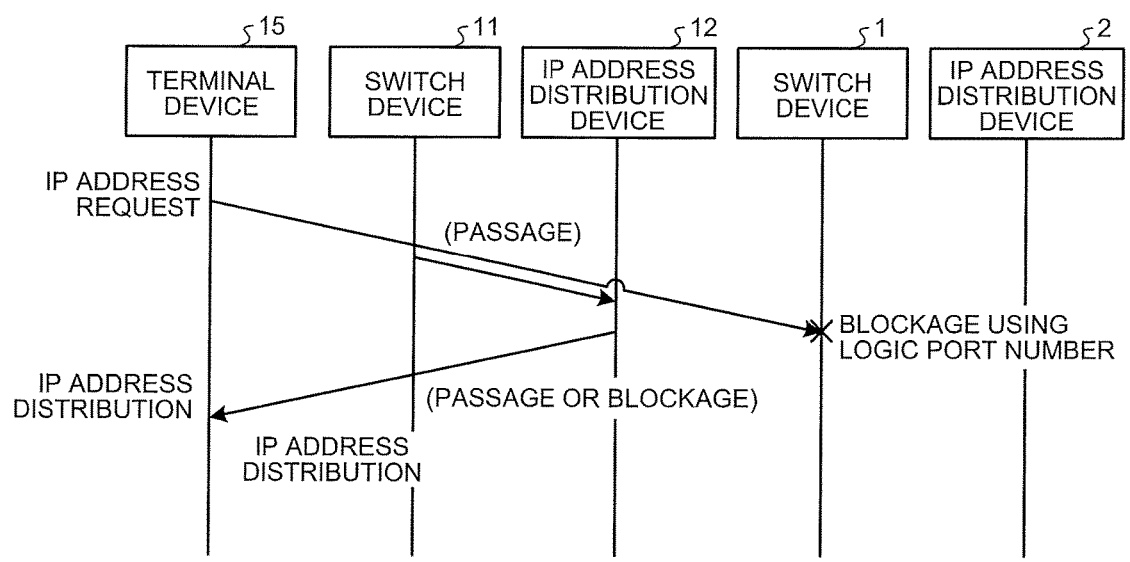
FIG. 9 is a sequence diagram illustrating exemplary IP address distribution operation according to the fourth embodiment.

FIG. 9 is a sequence diagram illustrating exemplary IP address distribution operation in the present embodiment. First, as illustrated in FIG. 9, the terminal device 15 sends the IP address request signal to the network by means of broadcasting. At this time, the above-mentioned specific logic port number is included in the IP address request signal. While the IP address request signal passes through the switch device 11 and reaches the IP address distribution device 12 by means of broadcasting, the IP address signal is blocked by the port P1 of the switch device 1. The subsequent IP address distribution operation is the same as that described in the first and second embodiments. The same applies to a case where the request for the IP address is made by the terminal device 14 or the terminal device 3.

The present embodiment can be easily generalized. That is, the arrival range of the IP address request signal can be segmented into a plurality of ranges that do not overlap each other, and one or more IP address distribution devices can be included in each of the ranges.

According to the present embodiment, since the arrival range of the IP address request signal is segmented into the plurality of ranges, the IP addresses can be set independently of each other in the different ranges. The other configuration, operation and effect of the present embodiment is the same as those in the first and second embodiments. The present invention can be combined with the third embodiment.

Fifth Embodiment

Figure 10:
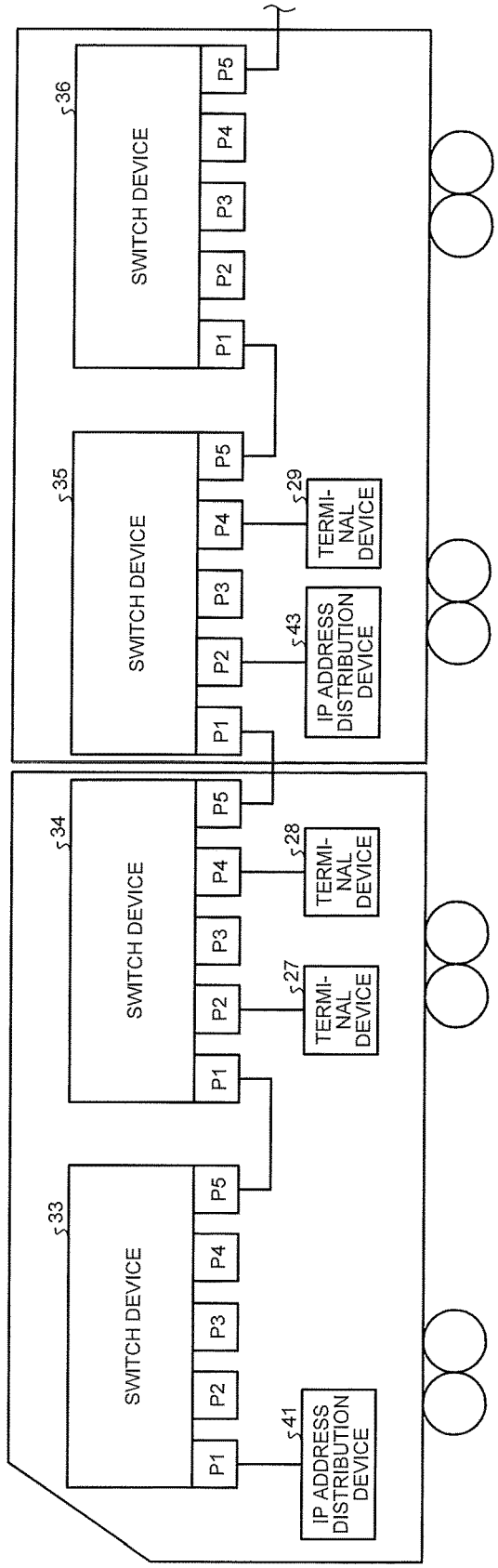
FIG. 10 is a diagram illustrating an exemplary configuration of an IP address distribution system according to a fifth embodiment.

FIG. 10 is a diagram illustrating an exemplary configuration of an IP address distribution system according to the present embodiment. The IP address distribution system according to the present embodiment is provided in a train, and the network is a network constructed in the train.

As illustrated in FIG. 10, the IP address distribution system according to the present embodiment includes switch devices 33 to 36 connected in the form of a daisy chain, an IP address distribution device 41 connected to the switch device 33, a terminal device 27 connected to the switch device 34, a terminal device 28 connected to the switch device 34, an IP address distribution device 43 connected to the switch device 35, and a terminal device 29 connected to the switch device 35.

More specifically, the switch devices 33 and 34, the IP address distribution device 42, and the terminal devices 27 and 28 are installed in a first car. The switch devices 35 and 36, the IP address distribution device 43, and the terminal device 29 are installed in a second car. Each of the switch devices 33 to 36 includes the ports P1 to P5. The port P5 of the switch device 33 is connected to the port P1 of the switch device 34, the port P5 of the switch device 34 is connected to the port P1 of the switch device 35, and the port P5 of the switch device 35 is connected to the port P1 of the switch device 36. The IP address distribution device 41 is connected to the port P1 of the switch device 33, the terminal device 27 is connected to the port P2 of the switch device 34, and the terminal device 28 is connected to the port P4 of the switch device 34. The IP address distribution device 43 is connected to the port P2 of the switch device 35, and the terminal device 29 is connected to the port P4 of the switch device 35.

Passage of the IP address request signal is blocked between the switch devices 34 and 35. Therefore, the IP address request signals from the terminal devices 27 and 28 in the first car reach only the IP address distribution device 41 in the first car without reaching the IP address distribution device 43 in the second car. Also, the IP address request signal from the terminal device 29 in the second car reaches only the IP address distribution device 43 in the second car without reaching the IP address distribution device 41 in the first car. In other words, the present embodiment is the fourth embodiment that is realized in the train, and is suitable when the IP addresses in the first car and the second car need to be managed independently. In order to segment the IP address request signals as described above, in the same manner as that in the fourth embodiment, the IP address request signal including the specific logic port number is blocked, for example, by the port P1 of the switch device 35.

In the network constructed in the train, generally, the connection between the switch devices constituting the network is fixed, and an installation instrument than is the terminal device connected to the switch device is also fixed. Therefore, the installation instrument in the train is desirably given the fixed IP address, depending on a placement position of the installation instrument. According to the present embodiment, the predetermined IP addresses can be fixedly given to the respective terminal devices 27 to 29 in the train. The other configuration, operation and effect of the present embodiment is the same as those in the first, second, and fourth embodiments.

Sixth Embodiment

Figure 11:
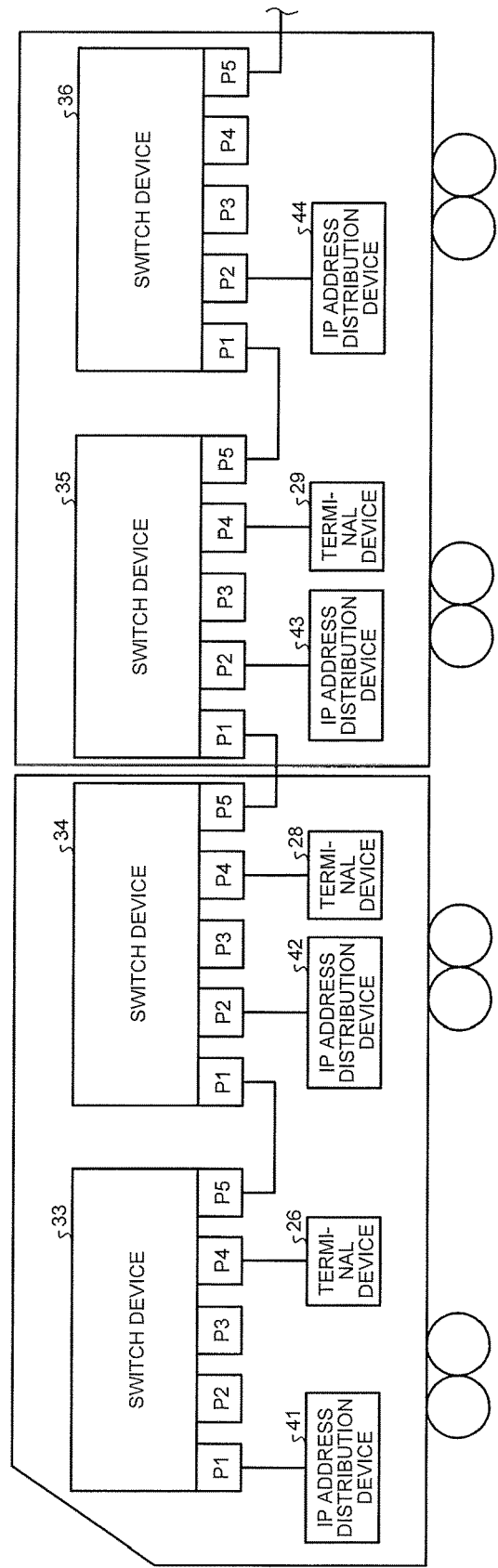
FIG. 11 is a diagram illustrating an exemplary configuration of as IP address distribution system according to a sixth embodiment.

FIG. 11 is a diagram illustrating an exemplary configuration of an IP address distribution system according to the present embodiment. The IP address distribution system according to the present embodiment is provided in a train, and the network is a network constructed in the train.

As illustrated in FIG. 11, the connection configuration of the switch devices 33 to 36 is the same as that illustrated in FIG. 10, and FIG. 11 differs from FIG. 10 in that a terminal device 26 is connected to the port P4 of the switch device 33, an IP address distribution device 42 is connected to the port P2 of the switch device 34 in place of the terminal device 27, and an IP address distribution device 44 is connected to the port P2 of the switch device 36.

Passage of the IP address request signal is blocked between the switch devices 34 and 35, and the IP address request signals from the terminal devices 26 and 28 in the first car reach only the IP address distribution devices 41 and 42 in the first car without reaching the IP address distribution devices 43 and 44 in the second car. Similarly, the IP address request signal from the terminal device 29 in the second car reaches only the IP address distribution devices 43 and 44 in the second car without reaching the IP address distribution devices 41 and 42 in the first car. In other words, the present embodiment is a combination of the third embodiment and the fourth embodiment that is realized in the train, and is suitable when the IP addresses in the first car and the second car need to be managed independently, and the redundancy of the IP address distribution operation needs to be ensured. The other configuration, operation, and effect of the present embodiment is the same as that in the fifth embodiment.

REFERENCE SIGNS LIST 1, 11, 21, 33 to 36 switch device, 2, 12, 22, 41 to 44 IP address distribution device, 3, 13, 14, 15, 23, 26 to 29 terminal device.

The invention claimed is:

1. An IP address distribution system comprising a switch device having a plurality of ports and constituting a network, a terminal device that is a request source of an IP address and connected to the network, an IP address distribution device that is a distribution source of the IP address and connected to the network, wherein
　on receiving an IP address request signal from the terminal device, the IP address distribution device sequentially transmits, to the terminal device, IP address distribution signals including respective distribution IP addresses that are IP addresses selected one by one from among all unused IP addresses in the network, and
　for the IP address distribution signals received at the switch device, the switch device is subjected to setting to determine passage or blockage of individual IP address distribution signals for each port of the plurality of ports of the switch device in accordance with contents of all or a part of the respective distribution IP addresses included in the individual IP address distribution signals.

2. The IP address distribution system according to claim 1, wherein the network is constituted by a plurality of switch devices, and
　among the plurality of ports in each switch device of the plurality of switch devices, a port to be used for a connection to another switch device of the plurality of switch devices unconditionally allows the individual IP address distribution signals to pass through the port.

3. The IP address distribution system according to claim 2, wherein the setting is unique to each of the switch devices, such that the IP address distribution signals allowed to pass through the plurality of ports of one of the switch devices are different from those allowed to pass through the plurality of ports of any remaining one of the switch devices.

4. The IP address distribution system according to claim 1, wherein a plurality of IP address distribution devices are connected to the network.

5. The IP address distribution system according to claim 4, wherein
　a plurality of terminal devices are connected to the network, and
　an arrival range of the IP address request signal in the network is segmented into a plurality of ranges that do not overlap each other, and one or more of the IP address distribution devices are included in each range of the plurality of ranges.

6. The IP address distribution system according to claim 1, wherein
　the network is a network constructed in a train.

7. A switch device comprising:
a plurality of ports, said switch device including the plurality of ports constitutes a network to which a terminal device and an IP address distribution device are connected,
wherein the terminal device is a request source of an IP address, and the IP address distribution device is a distribution source of the IP address, and
wherein when the IP address distribution device sequentially transmits, to the terminal device in response to a request for the IP address from the terminal device, IP address distribution signals including respective distribution IP addresses that are IP addresses selected one by one from among all unused IP addresses in the network, the switch device performs setting for the IP address distribution signals received at the switch device, to determine passage or blockage of individual IP address distribution signals for each port of the plurality of ports of the switch device in accordance with contents of all or a part of the respective distribution IP addresses included in the individual IP address distribution signals.

8. An IP address distribution method in an IP address distribution system comprising a switch device having a plurality of ports and constituting a network, a terminal device that is a request source of an IP address and connected to the network, and an IP address distribution device that is a distribution source of the IP address and connected to the network, the IP address distribution method comprising:

sending an IP address request signal to the network;
on receiving the IP address request signal from the terminal device, sequentially transmitting, to the terminal device, IP address distribution signals including respective distribution IP addresses that are IP addresses selected one by one from among all unused IP addresses in the network; and
on receiving the IP address distribution signals from the IP address distribution device, performing passage or blockage of individual IP address distribution signals on a basis of setting to determine passage or blockage of the individual IP address distribution signals for each port of the plurality of ports of the switch device in accordance with contents of all or a part of the respective distribution IP addresses included in the individual IP address distribution signals.

* * * * *